United States Patent Office 3,562,391
Patented Feb. 9, 1971

3,562,391
METHOD OF SUPPRESSING INFLAMMATION IN MAMMALS
Adolph Edward Sloboda, New City, N.Y., and Victor John Bauer, Montvale, N.J., assignors to American Cyanamid Company, Stamford, Conn., a corporation of Maine
No Drawing. Filed June 17, 1969, Ser. No. 834,161
Int. Cl. A01n 9/12
U.S. Cl. 424—322                                    5 Claims

ABSTRACT OF THE DISCLOSURE

This disclosure describes compositions of matter useful for suppressing inflammation in mammals and the method of suppressing inflammation in mammals therewith, the active ingredients of said compositions of matter being certain substituted 1-phenyl-1-alkyl-2-thioureas.

BRIEF SUMMARY OF THE INVENTION

This invention relates to novel compositions of matter usfeul for suppressing inflammation in mammals. More particularly, it relates to therapeutic compositions containing certain substituted 1-phenyl-1-alkyl-2-thioureas, or mixtures thereof, which suppress inflammation in mammals. The invention includes the new compositions of matter and the method of suppressing inflammation in mammals therewith.

Our invention is based upon the discovery that certain substituted 1-phenyl-1-alkyl-2-thioureas are potent suppressors of inflammation in mammals. The substituted 1-phenyl-1-alkyl-2-thioureas of the present invention may be represented by the following general formula:

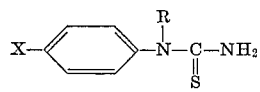

wherein X is hydrogen, fluoro or chloro and R is methyl, ethyl, n-propyl or isopropyl. Typical compounds in accordance with the above general formula are, for example, 1-(p-fluorophenyl)-1-methyl-2-thiourea,
1-(p-chlorophenyl)-1-methyl-2-thiourea,
1-(p-fluorophenyl)-1-n-propyl-2-thiourea,
1-(p-chlorophenyl)-1-n-propyl-2-thiourea,
1-(p-fluorophenyl)-1-isopropyl-2-thiourea,
1-(p-chlorophenyl)-1-isopropyl-2-thiourea, and the like.

DETAILED DESCRIPTION OF THE INVENTION

The substituted 1-phenyl-1-alkyl-2-thioureas of the present invention may be readily prepared by known reactions. Thus, an N-alkyl aniline is allowed to react with thiocyanic acid at elevated temperatures to provide a 1-phenyl-1-alkyl-2-thiourea [De Beer et al., J. Pharmacol. 57, 19 (1936)]; or, an N-alkyl aniline is allowed to react with silicon tetraisothiocyanate to provide a 1-phenyl-1-alkyl-2-thiourea [Neville et al., Can. J. Chem. 41, 2123 (1963)]; or, an N-alkyl aniline is allowed to react with benzoyl isothiocyanate to provide a 3-benzoyl-1-phenyl-1-alkyl-2-thiourea which is hydrolyzed to a 1-phenyl-1-alkyl-2-thiourea [Frank et al., Org. Synthese, Coll. vol. III, 735 (1955)]. These reactions may be illustrated by the following reaction scheme:

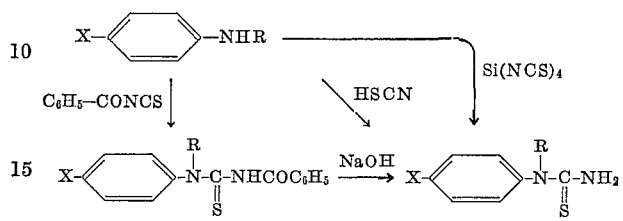

wherein X and R are as hereinabove defined. The preparation of some typical compounds useful in this method of treatment of inflammation are set forth in greater detail in the specific examples appended hereinafter.

The compounds useful in this method of treatment of inflammation possess the ability to suppress adjuvant-induced arthritis in rats, a standard laboratory procedure to assess useful antiinflammatory activity [Newbould, Brit. J. Pharmacol., 21, 127 (1963)]. Groups of three Wistar strain rats, weighing 200±10 g. each, are injected intradermally in the right hind paw with Freund's adjuvant (dried human tuberculin bacilli) in a mineral oil vehicle at a dosage of 10 mg./kg. of body weight. Test compounds are administered orally in a 1% starch vehicle at the indicated dosage in mg./kg. of body weight once daily on days 0 through 13 post-challenge. Control rats are treated in a similar manner, but are given saline solution instead of the test compounds. On the 14th and 21st day post-challenge the diameter of the injected paw (primary lesion) is measured by micrometer caliper, the volumes of inflamed paws are estimated from these measurements, and the results are expressed as percent inhibition of swelling as compared to controls. At the same time, the other inflamed sites, such as ears, paws, and tail (secondary lesions) are observed and the rat graded as to degree of inflammation and swelling present. The grading is based on a scale of 0 to 24.0, where 0 represents a complete absence of induced arthritic nodules and 24.0 represents the maximum degree of inflammation [Ward et al. J. Pharmacol. Exp. Ther. 152, 116 (1966)]. The mean grade for each treated group is calculated and the effects of each compound are expressed as percent inhibition of the control grade. The results in a repsentative operation, which are listed in Table I below by way of illustration, demonstrate that the 1-phenyl-1-alkyly-2-thioureas described are useful in the suppression of inflammation in mammals. Comparable data for aspirin and phenylbutazone, two drugs commonly used for the treatment of inflammation in mammals, in included in Table I. These results show that the 1-phenyl-1-alkyl-2-thioureas described in this invention often are efficacious at a lower dose and for a greater duration of time than the reference drugs. The results in Table I also show that animals treated with the substituted 1-phenyl-1-alkyl-2-thioureas continue to gain weight, a further indication of the improved well-being of the animals.

TABLE I.—EFFECT OF 1-PHENYL-1-ALKYL-2-THIOUREAS ON ADJUVANT-INDUCED ARTHRITIS IN RATS

| Treatment | Dose, mg./kg. | Mean wt. gain, g. Day 14 | Mean wt. gain, g. Day 21 | Primary lesion, percent inhibition of swelling Day 14 | Primary lesion, percent inhibition of swelling Day 21 | Secondary lesion, percent inhibition Day 14 | Secondary lesion, percent inhibition Day 21 |
| --- | --- | --- | --- | --- | --- | --- | --- |
| Saline (controls) | | 36 | 39 | 0 | 0 | 0 | 0 |
| Aspirin | 200 | 31 | 27 | 51 | 36 | 14 | 19 |
| Phenylbutazone | 75 | 57 | 54 | 72 | 23 | 24 | 12 |
| 1-ethyl-1-phenyl-2-thiourea | 50 | 52 | 79 | 51 | 78 | 28 | 52 |
| 1-methyl-1-phenyl-2-thiourea | 50 | 34 | 73 | 46 | 73 | 30 | 47 |
| 1-phenyl-1-n-propyl-2-thiourea | 50 | 45 | 70 | 25 | 55 | 27 | 41 |
| 1-isopropyl-1-phenyl-2-thiourea | 50 | 38 | 53 | 49 | 70 | 32 | 43 |
| 1-(p-chlorophenyl)-1-ethyl-2-thiourea | 50 | 43 | 78 | 33 | 59 | 25 | 37 |
| 1-(p-fluorophenyl)-1-ethyl-2-thiourea | 50 | 30 | 51 | 0 | 32 | 13 | 35 |

A common property of useful antiinflammatory agents is their ability to lower elevated body temperatures. The ability of the 1-phenyl-1-alkyl-2-thioureas described in this invention to reverse the yeast-induced pyrexia in rats [Winter, Proceeding of an International Symposium on Non-steroidal Antiinflammatory Drugs, Milan (1964), pp. 190–202] is demonstrated in Table II below. Comparative data for aspirin and phenylbutazone are included. Groups of three Wistar strain rates, weighing 60±5 g. each, are injected subcutaneously in the nape of the neck with 0.6 ml. of a 40% suspension of dried brewers yeast in distilled water. Each compound is administered orally at a dosage of 250 mg./kg. of body weight in buffered starch solution at 17 hours post-challenge. Control rats are treated in a similar manner, but are given saline solution instead of the test compounds. At nineteen hours post-challenge the rectal temperature of each rat is recorded. The results, expressed as suppression of temperature by subtracting the mean temperature of the treated rats from the mean temperature of the control pyretic rats, are shown in Table II below.

TABLE II

Effect of 1-phenyl-1-alkyl-2-thioureas on yeast-induced pyrexia in rats

| Treatment | Suppression of temperature, 0° C. |
| --- | --- |
| Saline (controls) | 0 |
| Aspirin | 1.5 |
| Phenylbutazone | 1.5 |
| 1-ethyl-1-phenyl-2-thiourea | 2.3 |
| 1-methyl-1-phenyl-2-thiourea | 2.9 |
| 1-phenyl-1-n-propyl-2-thiourea | 3.0 |
| 1-isopropyl-1-phenyl-2-thiourea | 1.4 |
| 1-(p-chlorophenyl)-1-ethyl-2-thiourea | 2.0 |
| 1-(p-fluorophenyl)-1-ethyl-2-thiourea | 1.6 |

The substituted 1-phenyl-1-alkyl-2-thioureas have thus been found to be highly useful for suppressing inflammation in mamals when administered in amounts ranging from about one mg. to about 100 mg. per kg. of body weight per day. A preferred dosage regimen for optimum results would be from about one mg. to about 50 mg. per kg. of body weight per day, and such dosage units are employed that a total of from about 0.07 g. to about 3.5 g. of active ingredient for a subject of about 70 kg. body weight are administered in a 24 hour period. The compounds of the present invention may be administered by any convenient route such as orally, interperitoneally, subcutaneously, intramuscularly or intravenously.

Compositions according to the present invention having the desired clarity, stability, and adaptability for parenteral use are obtained by dissolving from 0.10% to 10.0% by weight of active compound in a vehicle consisting of a polyhydric aliphatic alcohol or mixtures thereof. Especially satisfactory are glycerin, propylene glycol, and the polyethylene glycols. The polyethylene glycols consist of a mixture of non-volatile, normally liquid, polyethylene glycols which are soluble in both water and organic liquids and which have molecular weights of from about 200 to about 1500. Although the amount of active compound dissolved in the above vehicle may vary from 0.10% to 10.0% by weight, it is preferred that the amount of active compound employed be from about 3.0% to about 9.0% by weight. Although various mixtures of the aforementioned non-volatile polyethylene glycols may be employed, it is preferred to use a mixture having an average molecular weight of from about 200 to about 400.

In additiona to the active compounds, the parenteral solutions of the present invention may also contain various preservatives which may be used to prevent bacterial and fungal contamination. The preservatives which may be used for such purpose are, for example, benzyl alcohol, myristyl-gamma-picolinium chloride, phenyl mercuric nitrate, benzalkonium chloride, phenethyl alcohol, p-chlorophenyl-α-glycerol ether, methyl and propyl parabens, and thimerosal. As a practical matter it is also convenient to employ antioxidants. Suitable antioxidants include, for example, sodium bisulfite, sodium metabisulfite, and sodium formaldehyde sulfoxylate. Generally, from about 0.05% to about 0.2% concentrations of antioxidant are employed.

The preferred concentration of active compound is 25 to 50 mg./ml. of the finished compositions when intramuscular injection is the purpose for which the compositions are intended. They are equally adapted to intravenous administration when diluted with water or diluents employed in intravenous therapy such as isotonic glucose in appropriate quantities. For this use, initial concentrations down to about 10 to 25 mg./ml. of active compound are satisfactory. They are also adapted to oral administration when diluted with drinking water.

The active compounds of the present invention may be orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between about 10 and 200 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The invention will be described in greater detail in conjunction with the following specific examples.

EXAMPLE 1

Preparation of 3-benzoyl-1-phenyl-1-propyl-2-thiourea

To a stirred solution of 8.5 g. of ammonium thiocyanate in 50 ml. of acetone is added dropwise 14.1 g. of benzoyl chloride. The mixture is heated under reflux for 5 minutes, and then a solution of 13.5 g. of N-propylaniline in 25 ml. of acetone is added dropwise. The mixture is heated under reflux for 0.5 hour and poured into water. The solid which separates is collected and recrystallized from ethanol to provide pale yellow crystals, melting point 122–124° C.

EXAMPLE 2

Preparation of 1-phenyl-1-propyl-2-thiourea

A solution of 18.0 g. of 3-benzoyl-1-phenyl-1-propyl-2-thiourea, 18 g. of sodium hydroxide, and 100 ml. of water is heated under reflux for 6 hours, cooled, and extracted with chloroform. The chloroform solution is dried over anhydrous potassium carbonate and concentrated to an oily solid. Recrystallization from benzene-hexane provides colorless crystals, melting point 102–103° C.

EXAMPLE 3

Preparation of 3-benzoyl-1-isopropyl-1-phenyl-2-thiourea

To a stirred solution of 25.5 g. of ammonium thiocyanate in 150 ml. of acetone is added dropwise 42.3 g. of benzoyl chloride. The mixture is heated under reflux for 5 minutes, and then a solution of 40.5 g. of N-isopropylaniline in 75 ml. of acetone is added dropwise. The mixture is heated under reflux for 0.5 hour and poured into water. The solid which separates is collected and recrystallized from ethanol to provide pale yellow crystals, melting point 107–108° C.

EXAMPLE 4

Preparation of 1-isopropyl-1-phenyl-2-thiourea

A solution of 15 g. of 3-benzoyl-1-isopropyl-1-phenyl-2-thiourea, 15 g. of sodium hydroxide, and 100 ml. of water is heated under reflux for 4 hours, diluted with water, and filtered. Recrystallization of the solid from benzene provides colorless crystals, melting point 165–166° C.

EXAMPLE 5

Preparation of p-chloro-N-ethylformanilide

A mixture of 53.6 g. of p-chloroaniline, 111 g. of triethyl orthoformate, and 2 g. of sulfuric acid is heated at 100° C. until the distillation of ethanol is complete. The temperature is raised to 180° C. for 1 hour, and the liquid is distilled to provide a colorless liquid, boiling point 154–158° C. (16 mm.).

EXAMPLE 6

Preparation of p-chloro-N-ethylaniline

A mixture of 45 g. of p-chloro-N-ethylformanilide and 150 ml. of 10% hydrochloric acid is heated under reflux for 2 hours, cooled, made basic with sodium hydroxide, and extracted with ether. The ether solution is dried over anhydrous potassium carbonate and concentrated to a liquid which is distilled to provide a colorless liquid, boiling point 126–128° C. (18 mm.).

EXAMPLE 7

Preparation of 3-benzoyl-1-(p-chlorophenyl)-1-ethyl-2-thiourea

To a stirred solution of 8.5 g. of ammonium thiocyanate in 50 ml. of acetone is added dropwise 11.7 g. of benzoyl chloride. The mixture is heated under reflux for 5 minutes, and then a solution of 12.8 g. of p-chloro-N-ethylaniline in 25 ml. of acetone is added dropwise. The mixture is heated under reflux for 0.5 hour and poured into water. The solid which separates is collected and recrystallized from ethanol to provide colorless crystals, melting point 128–130° C.

EXAMPLE 8

Preparation of 1-(p-chlorophenyl)-1-ethyl-2-thiourea

A solution of 14.5 g. of 3-benzoyl-1-(p-chlorophenyl)-1-ethyl-2-thiourea, 14.5 g. of sodium hydroxide, and 50 ml. of water is heated under reflux for 6 hours, cooled, diluted with water, and extracted with chloroform. The chloroform solution is dried over anhydrous potassium carbonate and concentrated to a solid. Recrystallization from benzene-hexane provides colorless crystals, M.P. 115–116° C.

EXAMPLE 9

Preparation of N-ethyl-p-fluoroformanilide

A mixture of 100 g. of p-fluoroaniline, 200 ml. of triethyl orthoformate, and 3 g. of sulfuric acid is heated at 100° C. until the distillation of ethanol is complete. The temperature is raised to 180° C. for 1 hour, and the residue is distilled to provide a colorless liquid, boiling point 123–125° C. (12 mm.).

EXAMPLE 10

Preparation of N-ethyl-p-fluoroaniline

A mixture of 110 g. of N-ethyl-p-fluoroformanilide and 360 ml. of 10% hydrochloric acid is heated under reflux for 3 hours, cooled, made basic with sodium hydroxide, and extracted with chloroform. The chloroform solution is dried over anhydrous magnesium sulfate and concentrated to a liquid which is distilled to provide a colorless liquid, boiling point 87–89° C. (12 mm.).

EXAMPLE 11

Preparation of 3-benzoyl-1-ethyl-1-(p-fluorophenyl)-2-thiourea

To a stirred solution of 21 g. of ammonium thiocyanate in 200 ml. of acetone is added dropwise 36 g. of benzoyl chloride. The mixture is heated under reflux for 5 minutes, and then a solution of 35 g. of N-ethyl-p-fluoroaniline in 30 ml. of acetone is added dropwise. The mixture is heated under reflux for 0.5 hour and poured into water. The solid which separates is collected and recrystallized from ethanol to provide colorless crystals, melting point 98–99° C.

EXAMPLE 12

Preparation of 1-ethyl-1-(p-fluorophenyl)-2-thiourea

A solution of 51 g. of 3-benzoyl-1-ethyl-1-(p-fluorophenyl)-2-thiourea, 29 g. of sodium hydroxide, and 350 ml. of water is heated under reflux for 3 hours, cooled, and extracted with chloroform. The chloroform solution is dried over anhydrous magnesium sulfate and concentrated to a solid. Recrystallization from benzene-hexane provides colorless crystals, melting point 113–114° C.

EXAMPLE 13

Preparation of capsule formulation

| Ingredient: | Milligrams per capsule |
|---|---|
| 1-phenyl-1-methyl-2-thiourea | 50 |
| Starch | 80 |
| Magnesium stearate | 5 |

The active ingredient, starch and magnesium stearate are blended together. The mixture is used to fill hard shell capsules of a suitable size at a fill weight of 135 milligrams per capsule.

EXAMPLE 14

Preparation of tablet formulation

| Ingredient: | Milligrams per tablet |
|---|---|
| 1-phenyl-1-isopropyl-2-thiourea | 100 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120° F. The dry granules are passed through a No. 16 screen. The mixture is lubricated with magnesium stearate and compressed into tablets in a suitable tableting machine. Each tablet contains 100 milligrams of active ingredient.

EXAMPLE 15

Preparation of oral syrup formulation

| Ingredient: | | Amount |
|---|---|---|
| 1-(p-chlorophenyl)-1-ethyl-2-thiourea | mg | 5000 |
| Sorbitol solution (70% N.F.) | ml | 40 |
| Sodium benzoate | mg | 150 |
| Sucaryl | mg | 90 |
| Saccharin | mg | 10 |
| Red Dye (F.D. & C. No. 2) | mg | 10 |
| Cherry flavor | mg | 50 |
| Distilled water, qs to | ml | 100 |

The sorbitol solution is added to 40 milliliters of distilled water and the active ingredient is suspended therein. The sucaryl, saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose, or methylcellulose may be used. Phosphates, citrates or tartrates may be added as buffers. Preservatives may include the parabens, sorbic acid and the like and other flavors and dyes may be used in place of those listed above.

EXAMPLE 16

Preparation of intramuscular formulation

| Ingredient: | Amount, percent |
|---|---|
| 1-(p-fluorophenyl)-1-n-propyl-2-thiourea | 2.5 |
| Parabens (4:1 mixture of methyl and propyl) | 0.1 |
| Water for injection | 100 |

The parabens are dissolved in about one-half the volume of water for injection at 80° C. with stirring. The solution is cooled to below 40° C. and the active ingredient is dissolved therein. The cooled solution is adjusted to final volume with water for injection and is then sterilized by sterile filtration through a suitable filter.

We claim:
1. The method of suppressing inflammation in mammals which comprises administering to a mammal an effective amount of a compound of the formula:

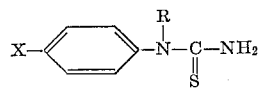

wherein X is selected from the group consisting of hydrogen, fluoro and chloro and R is selected from the group consisting of methyl, ethyl, n-propyl and isopropyl.

2. The method according to claim 1 wherein X is hydrogen and R is ethyl.

3. The method according to claim 1 wherein X is hydrogen and R is n-propyl.

4. The method according to claim 1 wherein X is hydrogen and R is methyl.

5. The method according to claim 1 wherein X is para-fluoro and R is n-propyl.

References Cited

Hamm et al., 55, 10789e (1961).
Saunders et al., 45, 4347a (1951).
Polizu et al., 64, 8061f (1966).
Chem. Abst. (1), 50, 1842d (1958).

STANLEY J. FRIEDMAN, Primary Examiner